United States Patent
Vayanos et al.

(10) Patent No.: US 8,228,917 B2
(45) Date of Patent: Jul. 24, 2012

(54) METHOD AND APPARATUS FOR CIPHERING AND RE-ORDERING PACKETS IN A WIRELESS COMMUNICATION SYSTEM

(75) Inventors: Alkinoos Hector Vayanos, Ann Arbor, MI (US); Francesco Grilli, San Diego, CA (US); Etienne F. Chaponniere, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 742 days.

(21) Appl. No.: 11/411,574

(22) Filed: Apr. 25, 2006

(65) Prior Publication Data

US 2007/0041382 A1    Feb. 22, 2007

Related U.S. Application Data

(60) Provisional application No. 60/675,277, filed on Apr. 26, 2005, provisional application No. 60/784,876, filed on Mar. 21, 2006.

(51) Int. Cl.
*H04L 12/28* (2006.01)

(52) U.S. Cl. ........................................ 370/394; 455/415

(58) Field of Classification Search .................. 370/236, 370/278, 389, 477; 455/415
See application file for complete search history.

(56) References Cited

U.S. PATENT DOCUMENTS

| | | | |
|---|---|---|---|
| 5,887,243 A | 3/1999 | Harvey et al. | |
| 6,094,575 A * | 7/2000 | Anderson et al. | 455/422.1 |
| 7,280,531 B2 | 10/2007 | Inui | |
| 2002/0025820 A1 | 2/2002 | Fauconnier et al. | |
| 2002/0164029 A1 | 11/2002 | Jiang | |
| 2003/0210714 A1 * | 11/2003 | Wu | 370/503 |
| 2005/0169205 A1 * | 8/2005 | Grilli et al. | 370/313 |
| 2006/0034175 A1 * | 2/2006 | Herrmann | 370/236 |
| 2006/0069857 A1 * | 3/2006 | Lekatsas et al. | 711/108 |
| 2006/0104266 A1 * | 5/2006 | Pelletier et al. | 370/389 |

FOREIGN PATENT DOCUMENTS

EP    0714180 A2    5/1996

(Continued)

OTHER PUBLICATIONS

"3rd Generation Partnership Project; Technical Specification Group Radio Access Network; Radio Interface Protocol Architecture", 3GPP TS 25.301 V6.4.0 (Sep. 2005).

(Continued)

*Primary Examiner* — Robert Wilson
*Assistant Examiner* — Wei Zhao
(74) *Attorney, Agent, or Firm* — Michael J. DeHaemer

(57) ABSTRACT

Techniques for performing ciphering and re-ordering using a single full sequence number are described. A transmitter ciphers input packets to obtain ciphered packets, with each input packet being ciphered with a full sequence number. The transmitter generates output packets for the ciphered packets, with each output packet including a partial sequence number used for re-ordering and derived from the full sequence number. The full sequence number may be incremented for each input packet or each byte of each packet. The partial sequence number may be used as a sequence number for RLC and may be used for re-ordering, duplicate detection, error correction, and/or other functions. A receiver performs the complementary processing, re-orders received packets based on the partial sequence number included in each packet, and deciphers the received packets using the partial sequence number included in each received packet.

60 Claims, 10 Drawing Sheets

FOREIGN PATENT DOCUMENTS

| | | |
|---|---|---|
| EP | 1326367 | 7/2003 |
| TW | 200302652 | 8/2003 |
| TW | 563321 | 11/2003 |
| WO | 01/24436 A2 | 4/2001 |

OTHER PUBLICATIONS

"3rd Generation Partnership Project; Technical Specification Group Radio Access Network; 3G Security; Security architecture", 3GPP TS 33.102 V6.5.0 (Dec. 2005).

International Search Report—PCT/US06/016065—International Search Authority, European Patent Office—Nov. 17, 2006.

Written Opinion—PCT/US06/016065—International Search Authority, European Patent Office—Nov. 17, 2006.

International Preliminary Report on Patentability—PCT/US06/016065—The International Bureau of WIPO, Geneva, Switzerland—Oct. 30, 2007.

Taiwan Search Report—095114891—TIPO—Mar. 30, 2009.

* cited by examiner

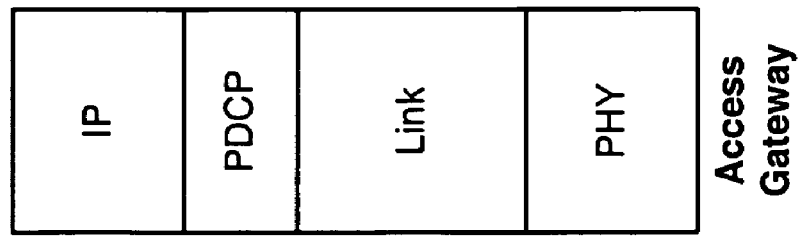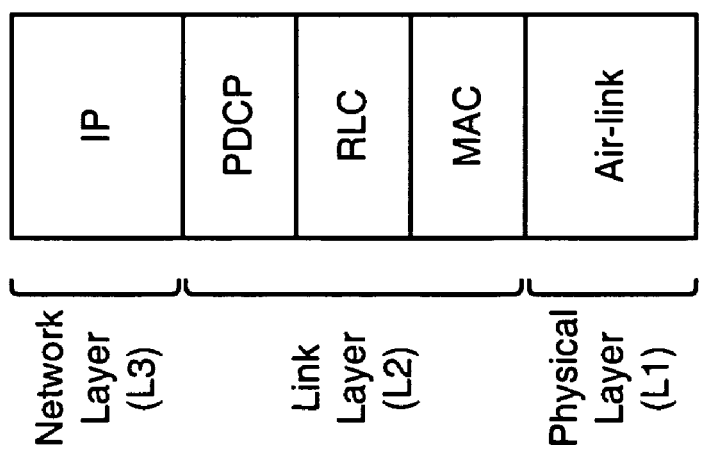
FIG. 2

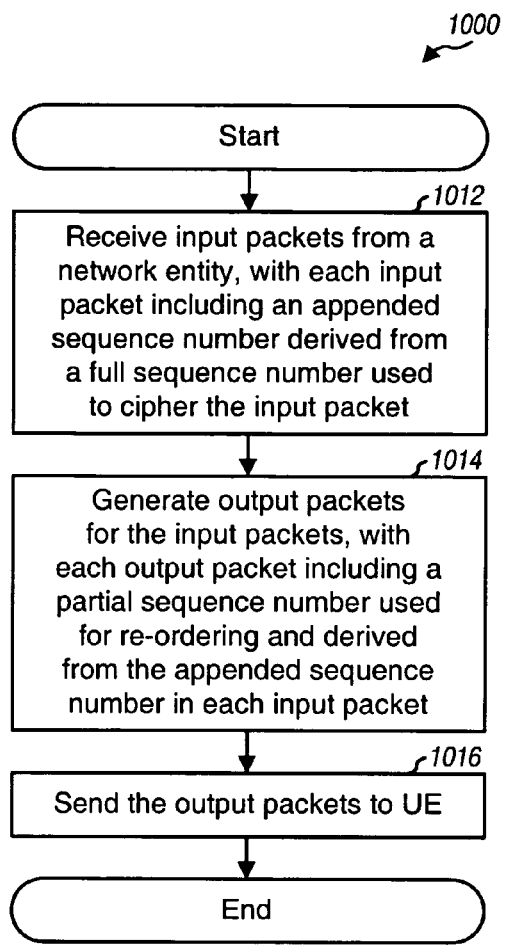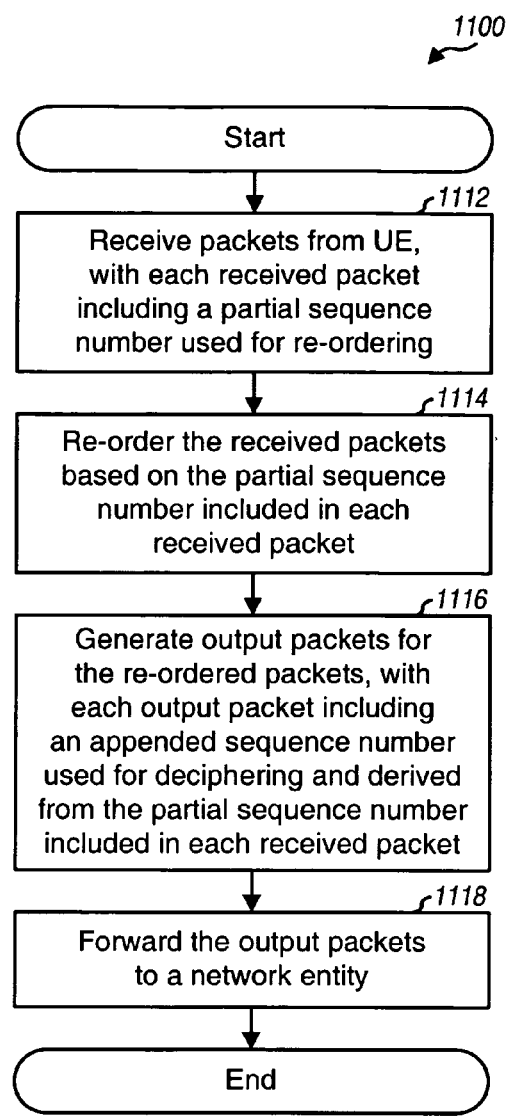
*FIG. 10*
*FIG. 11*

METHOD AND APPARATUS FOR CIPHERING AND RE-ORDERING PACKETS IN A WIRELESS COMMUNICATION SYSTEM

CLAIM OF PRIORITY UNDER 35 U.S.C. §119

The present Application for Patent claims priority to Provisional Application Ser. No. 60/675,277, entitled "Reducing Communication Processing Delays in a Wireless Communication System" filed Apr. 26, 2005, and Provisional Application Ser. No. 60/784,876, entitled "Reducing Communication Processing Delays in a Wireless Communication System" filed Mar. 21, 2006, assigned to the assignee hereof, and expressly incorporated herein by reference.

BACKGROUND

I. Field

The present disclosure relates generally to communication, and more specifically to techniques for ciphering and re-ordering packets in a wireless communication system.

II. Background

Wireless communication systems are widely deployed to provide various communication services such as voice, video, packet data, broadcast, messaging, and so on. These systems may be multiple-access systems capable of supporting communication for multiple users by sharing the available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

A wireless communication system may utilize Radio Link Control (RLC) for various functions such as re-ordering of received packets, detection of missing packets, and retransmission of packets received in error or missing. RLC typically appends a sequence number to each packet in order to accomplish these functions. RLC also typically resides at an interior network entity that is remote from a base station providing radio communication. Consequently, feedback from a receiver to a transmitter for RLC may incur extended delay. To reduce this delay, RLC may be moved to the base station. However, implementing RLC at the base station may cause other issues. For example, a user may be handed over from one base station to another base station. The RLC entities at both base stations would then need to synchronize their sequence numbers so that the user can properly re-order packets received from these base stations.

SUMMARY

Techniques for using a single full sequence number for both ciphering and re-ordering are described herein. These techniques may reduce overhead for each packet and may also provide synchronized sequence number for RLC during handover.

According to an embodiment of the invention, an apparatus is described which includes at least one processor and a memory. The processor(s) cipher input packets to obtain ciphered packets, with each input packet being ciphered with a full sequence number. The processor(s) then generate output packets for the ciphered packets, with each output packet including a partial sequence number used for re-ordering and derived from the full sequence number.

According to another embodiment, an apparatus is described which includes at least one processor and a memory. The processor(s) receive packets from at least one base station in a wireless communication system, with each received packet including a partial sequence number used for re-ordering. The processor(s) decipher the received packets using the partial sequence number included in each received packet.

According to yet another embodiment, an apparatus is described which includes at least one processor and a memory. The processor(s) receive input packets from a network entity, with each input packet including an appended sequence number derived from a full sequence number used to cipher the input packet. The processor(s) generate output packets for the input packets, with each output packet including a partial sequence number used for re-ordering and derived from the appended sequence number in each input packet. The processor(s) then send the output packets to a user equipment (UE).

According to yet another embodiment, an apparatus is described which includes at least one processor and a memory. The processor(s) receive packets from a UE, with each received packet including a partial sequence number used for re-ordering. The processor(s) re-order the received packets based on the partial sequence number included in each received packet. The processor(s) then generate output packets for the re-ordered packets, with each output packet including an appended sequence number used for deciphering and derived from the partial sequence number included in each received packet. The processor(s) forward the output packets to a network entity.

According to yet another embodiment, an apparatus is described which includes at least one processor and a memory. The processor(s) receive input packets from a higher layer at an RLC sublayer, with each input packet including sequence information indicative of an order of the input packet. The processor(s) generate output packets for the input packets and derive an RLC sequence number for each output packet based on the sequence information included in each input packet.

According to yet another embodiment, an apparatus is described which includes at least one processor and a memory. The processor(s) send a set of packets redundantly to each of multiple base stations. Each packet in the set includes a different sequence number, and duplicate packets sent to the multiple base stations include same sequence number.

According to yet another embodiment, an apparatus is described which includes at least one processor and a memory. The processor(s) receive at least one packet, cipher each packet with a sequence number for the packet, and increment the sequence number for each byte of each packet or for each packet.

Various aspects and embodiments of the invention are described in further detail below.

BRIEF DESCRIPTION OF THE DRAWINGS

FIG. 2 shows protocol stacks for a UE, an eNode B, and an access gateway.

FIG. 10 shows a process performed at an eNode B for downlink transmission.

FIG. 11 shows a process performed at an eNode B for uplink transmission.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The techniques described herein may be used for various wireless communication systems such as CDMA, TDMA, FDMA, and OFDMA systems. A CDMA system may implement one or more radio technologies such as Wideband-CDMA (W-CDMA), cdma2000, and so on. cdma2000 covers IS-2000, IS-856, and IS-95 standards. A TDMA system may implement a radio technology such as Global System for Mobile Communications (GSM). These various radio technologies and standards are known in the art. W-CDMA and GSM are described in documents from an organization named "3rd Generation Partnership Project" (3GPP). cdma2000 is described in documents from an organization named "3rd Generation Partnership Project 2" (3GPP2). For clarity, the techniques are specifically described below for a Universal Mobile Telecommunications System (UMTS) network that utilizes W-CDMA. The terms "system" and "network" are often used interchangeably. For clarity, 3GPP terminology is used for much of the description below.

Figure 1:
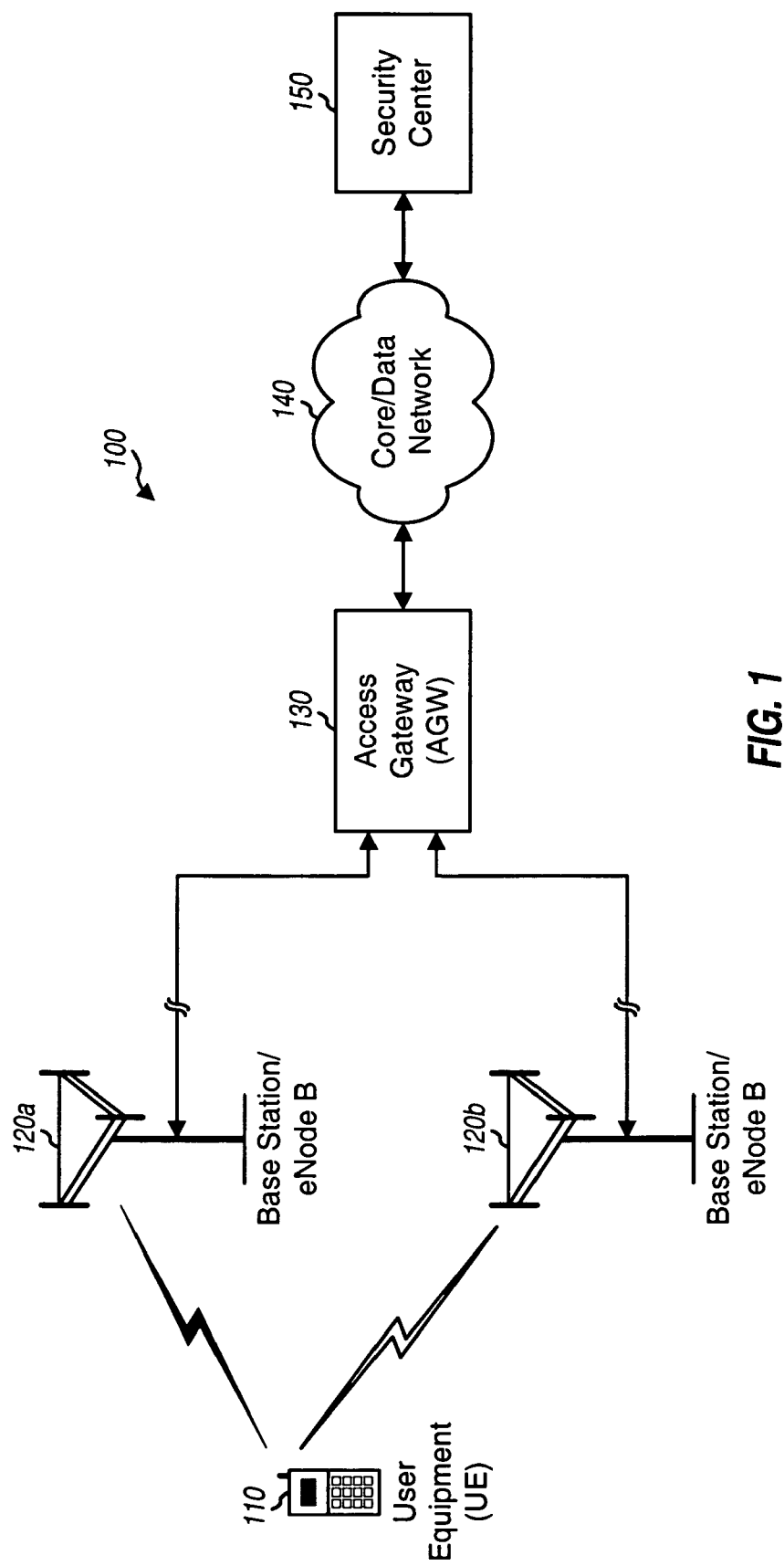
FIG. 1 shows a UE in a UMTS network.

FIG. 1 shows a user equipment (UE) 110 communicating with a UMTS network 100. UE 110 may also be referred to as a mobile station, an access terminal, a subscriber station, and so on. UE 110 may be a cellular phone, a wireless device, a personal digital assistant (PDA), a modem card, or some other apparatus or device.

UMTS network 100 includes network entities described by 3GPP. UE 110 may communicate with enhanced Node Bs (eNode Bs) 120 via an air-link connection. eNode Bs 120 may provide enhanced functionality over conventional Node Bs such as, e.g., mobility management. eNode Bs 120 communicate with an access gateway (AGW) 130 that provides data services for UE 110. The data services may be for packet data, voice-over-IP (VoIP), video, messaging, and so on. Access gateway 130 may be a single network entity or a collection of network entities. For example, access gateway 130 may comprise one or more Radio Network Controllers (RNCs), Serving GPRS Support Nodes (SGSNs), and Gateway GPRS Support Nodes (GGSNs), which are known in the art. Access gateway 130 may couple to core and/or data network 140 (e.g., the Internet) and may communicate with other entities (e.g., remote hosts) that couple to core/data network 140.

UMTS network 100 may be a serving network with which UE 110 currently communicates. UE 110 may have a subscription with a home network. The serving network may be different from the home network if UE 110 is roaming. The home network may include a security center 150 (e.g., a home environment/authentication center) that stores security and other pertinent information for UE 110.

The network entities in FIG. 1 may be referred to by other names in other wireless communication networks. For example, eNode Bs 120 may also be referred to as base stations, access points, base transceiver stations, and so on. For 3GPP2, access gateway 130 may comprise one or more Mobile Switching Centers (MSCs), Packet Control Functions (PCFs), and Packet Data Serving Nodes (PDSNs).

FIG. 2 shows exemplary protocol stacks 200 for data communication between UE 110 and access gateway 130 via eNode B 120. Each entity maintains a protocol stack for communication with another entity. Each protocol stack typically includes a transport layer (not shown in FIG. 2), a network layer (L3), a link layer (L2), and a physical layer (L1). UE 110 may communicate with a remote host (not shown in FIG. 2) using Transmission Control Protocol (TCP), User Datagram Protocol (UDP), or some other protocol at the transport layer. UE 110 and access gateway 130 may exchange data using Internet Protocol version 4 (IPv4) or IP version 6 (IPv6) at the network layer. Transport layer data (e.g., for TCP and/or UDP) is encapsulated in IP packets, which are exchanged between UE 110 and access gateway 130.

The link layer is typically dependent on wireless network technology. In the embodiment shown in FIG. 2, the link layer for UE 110 is composed of three sublayers for Packet Data Convergence Protocol (PDCP), Radio Link Control (RLC), and Medium Access Control (MAC), which perform the functions described below. PDCP is terminated at access gateway 130 whereas RLC and MAC are terminated at eNode B 120. UE 110 further communicates with eNode B 120 via W-CDMA air-link interface at the physical layer. eNode B 120 may communicate with access gateway 130 via a technology-dependent interface for the link and physical layers.

FIG. 2 shows exemplary protocol stacks for a user plane that carries traffic/packet data. Protocol stacks for a control plane that carries signaling are not shown for simplicity. For the user plane protocol stack, in the transmit path, each layer/sublayer receives service data units (SDUs) from the next higher layer/sublayer and generates protocol data units (PDUs) for the next lower layer/sublayer. A PDU sent from a given layer/sublayer is an SDU received at the next lower layer/sublayer. For a given layer/sublayer, there may or may not be a one-to-one mapping between SDUs and PDUs for that layer. In the receive path, each layer/sublayer receives PDUs from the next lower layer/sublayer and provides SDUs to the next higher layer/sublayer.

The protocols in the link layer may be designed to provide various functions. In general, a given function may be implemented in any of the protocols. However, implementing a given function in different protocols may give different results. A specific embodiment of PDCP and RLC is given below.

PDCP may provide the following functions:
  Header compression and decompression of IP data streams
    (e.g., for TCP/IP or RTP/UDP/IP headers) at a transmitter and a receiver, respectively; and
  Ciphering and deciphering of data at the transmitter and receiver, respectively, to prevent unauthorized acquisition of data.

Ciphering is synonymous with encryption, and deciphering is synonymous with decryption.

RLC may provide the following functions:
  Segmentation and reassembly of variable-length upper layer PDUs into/from smaller RLC PDUs to match the transmission capability of the air-link;
  Re-ordering at the receiver to provide in-sequence delivery of upper layer PDUs;
  Duplicate detection to detect for duplicate received RLC PDUs and to ensure that each upper layer PDU is delivered only once to the upper layer; and
  Error correction by retransmission of RLC PDUs received in error or missing.

PDCP and RLC may support different and/or additional functions besides the functions given above. The functions provided by PDCP and RLC are described in 3GPP TS 25.301, entitled "Technical Specification Group Radio Access Network; Radio Interface Protocol Architecture," Release 6, Sep. 2005, which is publicly available.

In the embodiment shown in FIG. 2, PDCP is terminated at UE 110 and access gateway 130 whereas RLC is terminated at UE 110 and eNode B 120. By performing ciphering and deciphering at PDCP, data may be securely sent across the entire UMTS network 100. By terminating RLC at eNode B 120 instead of access gateway 130, RLC functions such as retransmission may be performed faster, which may improve performance for delay sensitive applications.

UE 110, access gateway 130, and security center 150 may perform an authorization and key agreement (AKA) procedure in order to establish a secure data session between UE 110 and access gateway 130. The AKA procedure authenticates access gateway 130 and security center 150 to UE 110, authenticates UE 110 to access gateway 130, and provides a cipher key from security center 150 to access gateway 130. UE 110 is able to generate the same cipher key with a user-specific secret key that is known to both UE 110 and security center 150. UE 110 and access gateway 130 may thereafter securely exchange data using the cipher key. The AKA procedure for 3GPP is described in 3GPP TS 33.102, entitled "Technical Specification Group Services and System Aspects; 3G Security; Security architecture," Release 6, Dec. 2005, which is publicly available.

Figure 3:
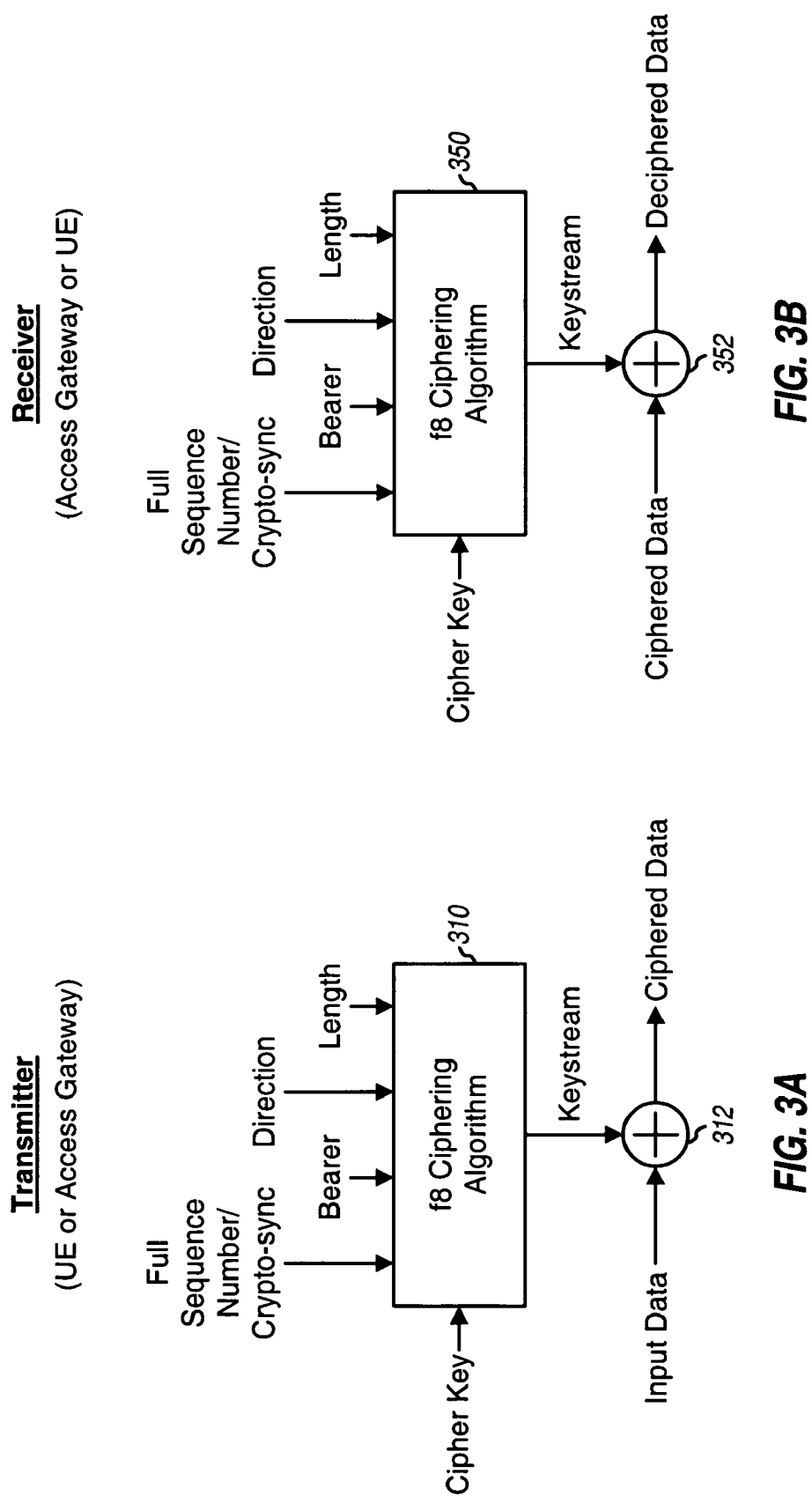
FIG. 3A shows ciphering at a transmitter.
FIG. 3B shows deciphering at a receiver.

FIG. 3A shows ciphering at a transmitter, which may be UE 110 for uplink transmission or access gateway 130 for downlink transmission. A unit 310 receives the cipher key, a full sequence number/crypto-sync, a bearer identifier, a direction bit, and a length indicator. Unit 310 generates a random keystream based on all of the inputs and in accordance with an f8 ciphering algorithm defined by 3GPP. The full sequence number/crypto-sync is a number that may be incremented for each data byte or each packet and acts as a time-variant input for the ciphering algorithm. The bearer identifier indicates the bearer of the data being ciphered. The direction bit is set to '0' for uplink transmission from UE 110 to access gateway 130 and to '1' for downlink transmission from access gateway 130 to UE 110. The length indicator indicates the length of the keystream generated by unit 310. An exclusive-OR gate 312 performs bit-wise modulo-2 addition of input data bits with the keystream from unit 310 and provides ciphered data bits.

FIG. 3B shows deciphering at a receiver, which may be UE 110 for downlink transmission or access gateway 130 for uplink transmission. A unit 350 receives the cipher key, the full sequence number/crypto-sync, the bearer identifier, the direction bit, and the length indicator. Unit 350 generates the random keystream based on all of the inputs and in the same manner as unit 310 at the transmitter. An exclusive-OR gate 352 performs bit-wise modulo-2 addition of the ciphered data bits with the keystream from unit 350 and provides deciphered data bits.

Separate full sequence numbers/crypto-syncs may be used for downlink and uplink transmissions and may be generated/allocated by various entities. In an embodiment, UE 110 generates the full sequence numbers used for downlink and uplink transmissions. In another embodiment, a transmitter generates the full sequence number for its link. In this embodiment, access gateway 130 may generate the full sequence number used for downlink transmission to UE 110, and UE 110 may generate the full sequence number used for uplink transmission to access gateway 130. In yet another embodiment, access gateway 130 or some other network entity may generate the full sequence numbers used for downlink and uplink transmissions. In any case, both the transmitter and receiver for each link have knowledge of the full sequence number used for that link.

The full sequence number/crypto-sync for each link may be generated in various manners. In one embodiment, UE 110 stores a hyperframe number (HFN) and generates the full sequence number for each link using the HFN. UE 110 may set the less significant portion of the full sequence number for the uplink to the HFN and may set the more significant portion of the full sequence number to a predetermined value (e.g., all zeros). The HFN may be updated (e.g., incremented by two) for each data call so that different starting full sequence numbers are used for different calls. The full sequence number for the downlink may be set equal to the full sequence number for the uplink at the start of the call. However, the two full sequence numbers may be incremented at different rates depending on the amount of data being sent on each link. The generation of a crypto-sync based on an HFN and the updating of the HFN may be performed as described in the aforementioned 3GPP TS 33.102.

In another embodiment, the full sequence number for each link is a randomly generated number. In yet another embodiment, the full sequence number for each link is initialized to a predetermined value (e.g., zero) at the start of ciphering. In yet another embodiment, the full sequence number for each link is generated based on information such as, e.g., the current system time, the identity of UE 110, the identity of access gateway 130, and so on. The full sequence number for each link may also be generated in other manners. The full sequence number for each link may be any length (e.g., 64 bits, 128 bits, and so on) that can provide good performance.

RLC may support an acknowledged mode (AM) and an unacknowledged mode (UM). In the acknowledged mode, the transmitter performs retransmission of an RLC PDU when a negative acknowledgement (NAK) is received for the PDU. In the unacknowledged mode, the receiver does not send NAKs, and the transmitter does not perform retransmission. For both modes, each RLC PDU includes an RLC header that contains an RLC sequence number. The RLC sequence number may be used by the receiver for various purposes such as re-ordering of received RLC PDUs, detection of duplicate and missing RLC PDUs, and so on. A different RLC sequence number may be used for each RLC instance, e.g., each RLC flow. For each RLC instance, the RLC sequence number may be initialized to a predetermined value (e.g., zero) and may thereafter be incremented by one for each RLC PDU, each data byte, or some other amount of data.

Figure 4:
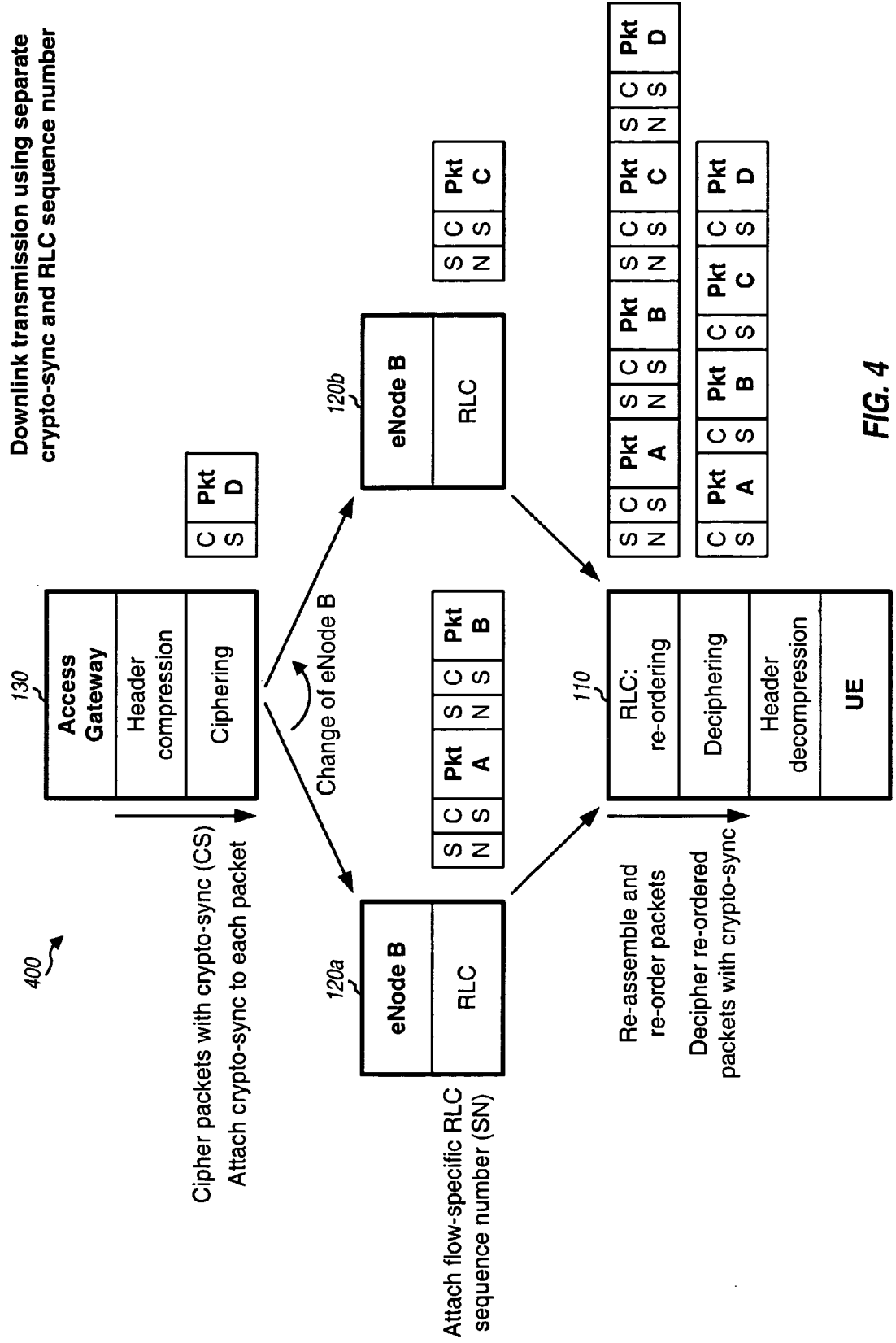
FIG. 4 shows downlink transmission using separate crypto-sync and RLC sequence number.

FIG. 4 shows an embodiment of a process 400 for downlink transmission using separate crypto-sync and RLC sequence number. In the example shown in FIG. 4, UE 110 initially communicates with eNode B 120a, receives packets A and B on the downlink from eNode B 120a, is handed over from eNode B 120a to eNode B 120b, and receives additional packets C and D from eNode B 120b.

For clarity, FIG. 4 shows only pertinent PDCP and RLP functions at UE 110, eNode Bs 120a and 120b, and access gateway 130. Access gateway 130 receives packets to be sent to UE 110, e.g., from a remote host. Access gateway 130 may perform header compression on each packet to reduce the headers of the protocols in higher layers. In general, the header compression may be enabled or disabled at access gateway 130. For clarity, the following description assumes that header compression is enabled. Access gateway 130 then performs ciphering on each header compressed packet, e.g., as shown in FIG. 3A, to generate a ciphered packet. Each ciphered packet may include, e.g., a ciphered compressed header, a ciphered payload, and the crypto-sync used to cipher that packet. In FIG. 4, the ciphered compressed header and ciphered payload for each packet is denoted as "Pkt", and the crypto-sync is denoted as "CS". In the example shown in FIG. 4, access gateway 130 receives four packets A, B, C and D in this order, processes each received packet to generate a ciphered packet, forwards ciphered packets A and B to eNode B 120a, and then forwards ciphered packets C and D to eNode B 120b.

eNode B 120a receives ciphered packets A and B from access gateway 130 and attaches an RLC header to each ciphered packet. The RLC header for each ciphered packet includes an RLC sequence number for that packet, which is denoted as "SN" in FIG. 4. The RLC sequence number is incremented such that UE 110 is able to ascertain that packet B follows packet A. Similarly, eNode B 120b receives ciphered packets C and D from access gateway 130 and attaches an RLC header with an RLC sequence number to each ciphered packet. If the RLC instance is moved from eNode B 120a to eNode B 120b when UE 110 is handed over to eNode B 120b, then eNode B 120b may use the continuation of the RLC sequence number used by eNode B 120a. If the RLC instance is not moved to eNode B 120b, then eNode B 120b may start a new RLC sequence number. In any case, UE 110 is able to ascertain that packets C and D follow packet B based on the RLC sequence number and/or handover information.

UE 110 receives ciphered packets A and B from eNode B 120a, re-orders these packets in the proper order based on the RLC sequence number included in each packet, and removes the RLC sequence number in each packet. UE 110 also receives ciphered packets C and D from eNode B 120b, re-orders these packets in the proper order, and removes the RLC sequence number in each packet. UE 110 performs deciphering on each ciphered packet with the crypto-sync included in that packet, e.g., as shown in FIG. 3B, to obtain a deciphered packet. UE 110 also performs header decompression, if header compression was performed at access gateway 130, to obtain decompressed packets. UE 110 may perform re-ordering, deciphering, and decompression as packets are received and may provide decompressed packets in the proper order to higher layer.

Figure 5:
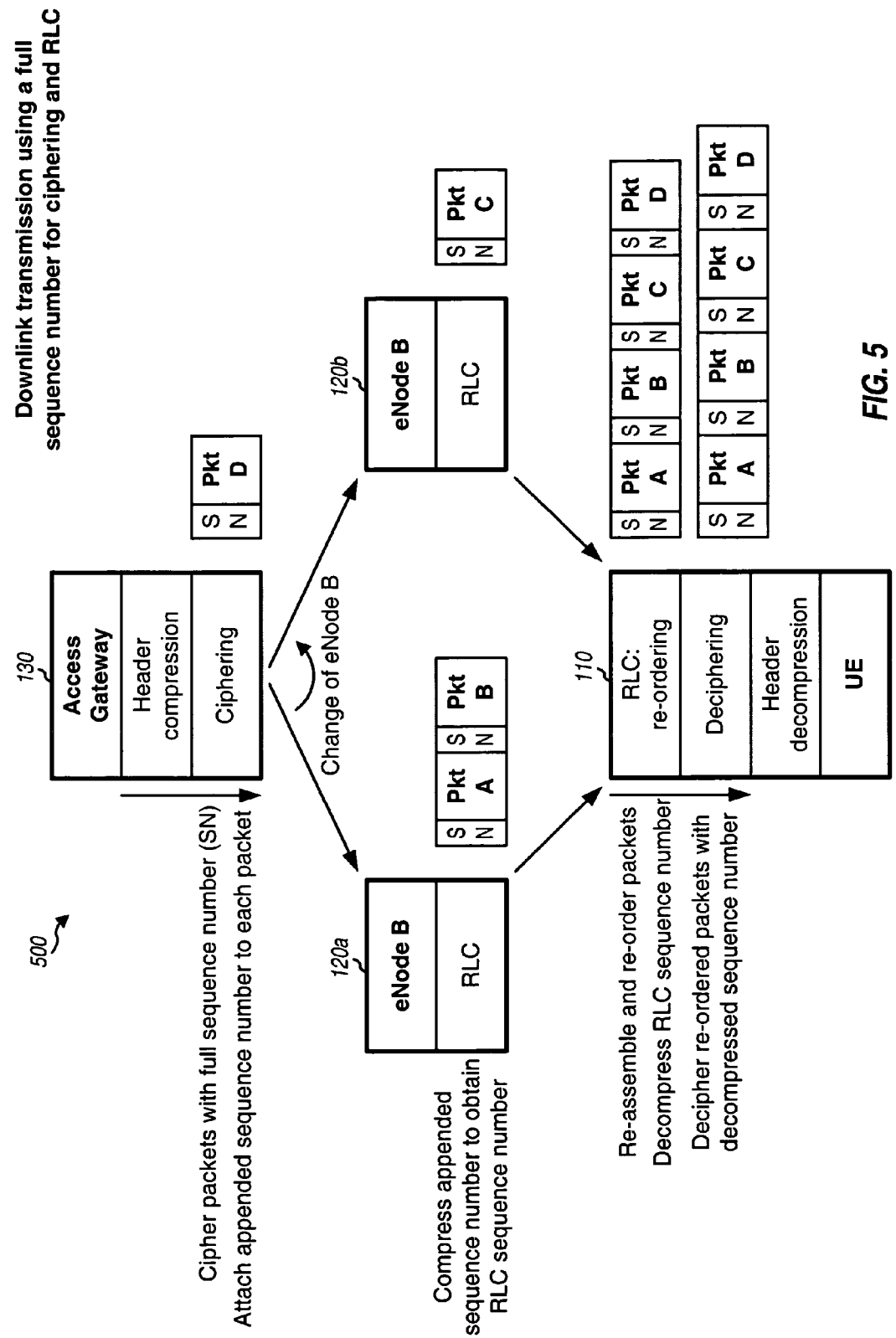
FIGS. 5 and 6 show downlink and uplink transmissions, respectively, using a full sequence number for both ciphering and RLC.

FIG. 5 shows an embodiment of a process 500 for downlink transmission using a full sequence number for both ciphering and RLC. In this embodiment, the full sequence number is utilized for both the crypto-sync used for ciphering and the RLC sequence number used for re-ordering and other functions.

Access gateway 130 receives packets to be sent to UE 110, performs header compression on each packet, and performs ciphering on each header compressed packet with the full sequence number to generate a ciphered packet. In the example shown in FIG. 5, access gateway 130 processes packets A through D, forwards ciphered packets A and B to eNode B 120a, and forwards ciphered packets C and D to eNode B 120b. Each ciphered packet may include, e.g., a ciphered compressed header, a ciphered payload, and an appended sequence number, which is denoted as "SN" in FIG. 5. The appended sequence number may be the full sequence number or a less significant portion of the full sequence number.

eNode B 120a receives ciphered packets A and B from access gateway 130 and re-uses the appended sequence number in each packet as the RLC sequence number for that packet. Similarly, eNode B 120b receives ciphered packets C and D from access gateway 130 and re-uses the appended sequence number in each packet as the RLC sequence number for that packet. eNode Bs 120a and 120b may compress the appended sequence number in each packet, e.g., by retaining only a predetermined number of least significant bits (LSBs), and may attach a partial sequence number to the packet. The partial sequence number is used as the RLC sequence number and may be equal to the appended sequence number received from access gateway 130 or a less significant portion of the appended sequence number. The full sequence number is incremented such that UE 110 is able to ascertain the order of packets A through D based on the RLC sequence number included in each packet sent by eNode Bs 120a and 120b.

UE 110 receives ciphered packets A and B from eNode B 120a and ciphered packets C and D from eNode B 120b. UE 110 re-orders these packets in the proper order based on the RLC sequence number included in each packet. UE 110 then decompresses the RLC sequence number in each packet to obtain a full sequence number for that packet and performs deciphering on each ciphered packet with the full sequence number as the crypto-sync. UE 110 may perform re-ordering, deciphering, and decompression as packets are received and may provide decompressed packets in the proper order to higher layer.

For simplicity, FIG. 5 shows an embodiment in which each ciphered packet corresponds to one PDCP PDU, and each PDCP PDU is sent as one RLC PDU. In this embodiment, the RLC sequence number for each RLC PDU may be derived based on the appended sequence number for the corresponding PDCP PDU. In another embodiment, RLC may perform segmentation and concatenation so that a given PDCP PDU may be sent in one or multiple RLC PDUs, and a given RLC PDU may carry data from one or multiple PDCP PDUs. In this embodiment, the full sequence number may be incremented for each data byte, and each data byte would then be associated with a different full sequence number. The appended sequence number for each PDCP PDU may be derived from the full sequence number for the first data byte in that PDCP PDU. Similarly, the RLC sequence number for each RLC PDU may be derived based on the full sequence number for the first data byte in that RLC PDU. The RLC entity may determine the RLC sequence number for each RLC PDU based on the appended sequence number in each PDCP PDU and counting data bytes.

The full sequence number may be generated by various entities and in various manners, as described above. The full sequence number may be decomposed into an HFN and an RLC sequence number, as described above. UE 110 and access gateway 130 may be informed of the full sequence number or the HFN (e.g., during signaling exchange to initiate ciphering) and may store the full sequence number or HFN. The RLC sequence number may be included in each packet sent from eNode B 120 to UE 110. UE 110 may determine the full sequence number for each received packet based on the RLC sequence number included in that packet and the HFN stored at UE 110. UE 110 and access gateway 130 may each maintain a counter for the HFN to account for wrap around of the RLC sequence number. In general, UE 110 may generate the full sequence number for each packet based on the less significant portion of the full sequence number appended in that packet and the more significant portion of the full sequence number stored at the UE.

The full sequence number may be any size (e.g., 32 bits, 64 bits, 128 bits, and so on) that can provide good performance. The entire full sequence number or a portion of the full sequence number may be appended to each packet sent from access gateway 130 to eNode B 120. Since the backhaul bandwidth may be high, access gateway 130 may send the entire full sequence number. However, to reduce overhead in over-the-air transmission, eNode B 120 may compress the appended sequence number to the size normally used for the RLC sequence number. In a specific embodiment, the full sequence number is 128 bits long, the appended sequence number in each packet sent from access gateway 130 to eNode B 120 is composed of 18 to 128 LSBs of the full sequence number, and the partiaVRLC sequence number in each packet sent from eNode B 120 to UE 110 is composed of 6 to 18 LSBs of the full sequence number. In this embodiment, the HFN may be 122 bits long to cover the case in which 6 bits are used for the RLC sequence number. UE 110 may reconstruct the full sequence number based on the RLC sequence number and as many most significant bits (MSBS) of the HFN as needed. Other sizes may also be used for the full, appended and partial/RLC sequence numbers and the HFN.

The full sequence number may be updated in various manners. In an embodiment, the full sequence number is incremented by one for each packet, which may have a fixed or variable size. In another embodiment, the full sequence number is incremented by one for each data byte. In this embodiment, the full sequence number at the end of a packet may be determined by the full sequence number at the start of the packet and the packet size. The full sequence number may also be updated in other manners.

The use of a single full sequence number for both ciphering and RLC may provide various advantages. First, lower overhead is incurred for each packet by re-using the sequence number used for ciphering as the RLC sequence number. Second, having a single sequence number space for all packets sent across different eNode Bs may ease data forwarding procedures and simplify synchronization of RLC's sequence number space across different eNode Bs during handover. Since the same sequence number space is used when switching from eNode B 120a to eNode B 120b, UE 110 is able to re-order the packets received from these eNode Bs without ambiguity. This avoids failure in RLC sequence number synchronization across eNode Bs, which may not be detected at RLC. However, since header decompression functionality at PDCP typically expects packets to arrive in sequence for proper operation, RLC synchronization failure may cause a header decompression entity to not function properly.

The use of a single full sequence number for both ciphering and RLC may also be beneficial for bi-casting, which is the forwarding of the same data from access gateway 130 to multiple eNode Bs 120. For a bi-casting operation, access gateway 130 forwards the same set of packets to multiple eNode Bs 120. The eNode B currently serving UE 110 on the downlink transmits packets to the UE and the non-serving eNode Bs discard the packets that have been transmitted by the serving eNode B. Bi-casting may be used to reduce delay for delay sensitive data, e.g., for voice, gaming, and so on. If independent crypto-sync and RLC sequence number are used in bi-casting, e.g., as shown in FIG. 4, then the RLC sequence numbers from all eNode Bs participating in the bi-casting operation should be synchronized to ensure proper re-assembly and re-ordering of the packets at UE 110. However, if a single full sequence number is used for both ciphering and RLC, then the RLC entities at all eNode Bs involved in the bi-casting operation can have synchronized RLC sequence numbers for free.

Figure 6:
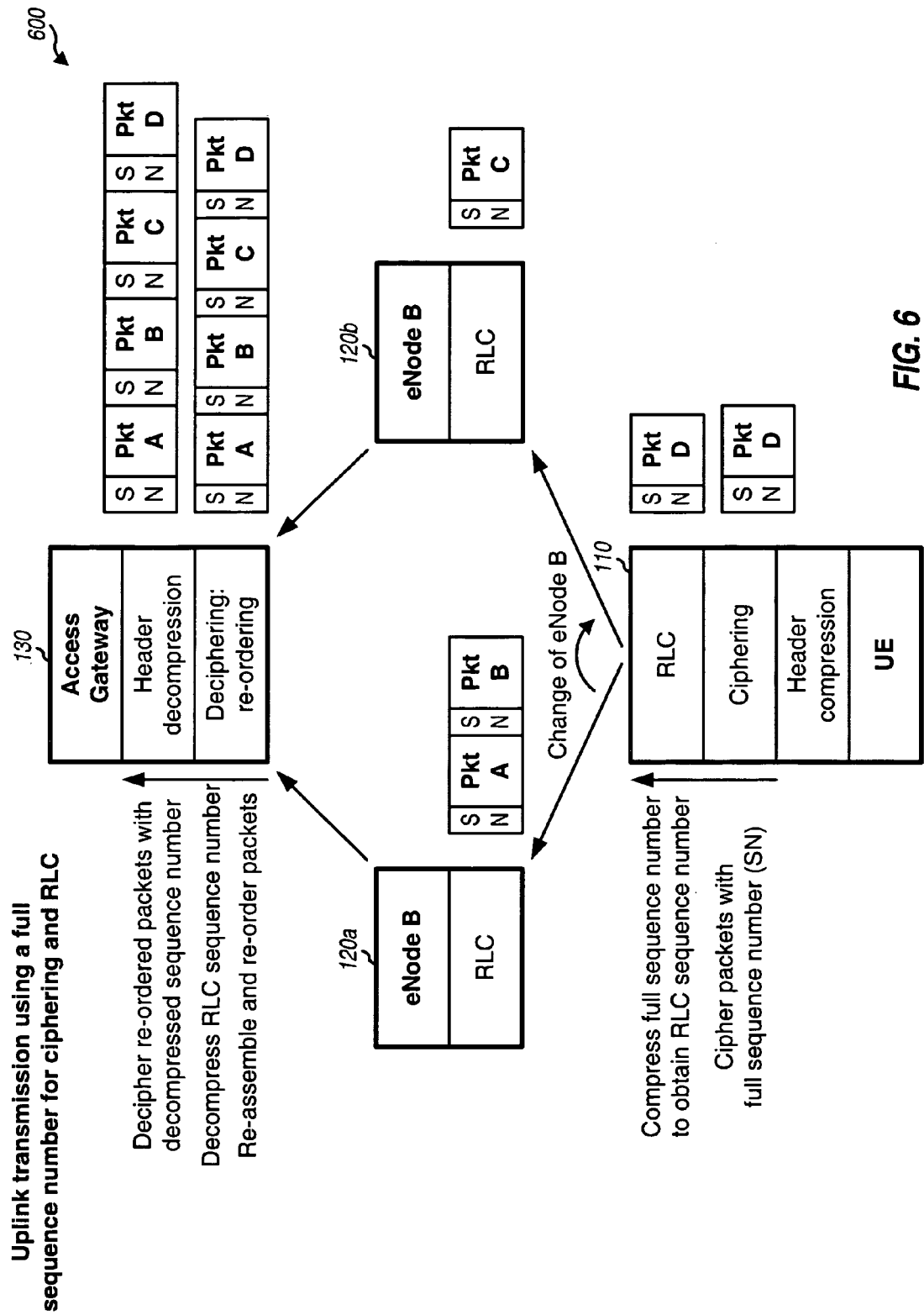

FIG. 6 shows an embodiment of a process 600 for uplink transmission using a full sequence number for ciphering and RLC. In the example shown in FIG. 6, UE 110 initially communicates with eNode B 120a, sends packets A and B on the uplink to eNode B 120a, is handed over from eNode B 120a to eNode B 120b, and sends additional packets C and D to eNode B 120b.

UE 110 performs header compression on each packet and ciphers each header compressed packet to generate a ciphered packet. Each ciphered packet may include, e.g., a ciphered compressed header and a ciphered payload. UE 110 attaches an RLC sequence number to each ciphered packet, which may be a predetermined number of LSBs of the full sequence number.

eNode B 120a receives ciphered packets A and B from UE 110, re-orders these packets in the proper order based on the RLC sequence number in each packet, and forwards the packets to access gateway 130. Similarly, eNode B 120b receives ciphered packets C and D from UE 110, re-orders these packets in the proper order, and forwards the packets to access gateway 130.

Access gateway 130 decompresses the RLC sequence number in each packet to obtain a full sequence number for that packet. Access gateway 130 then deciphers each ciphered packet with the full sequence number as the crypto-sync. Access gateway 130 also performs header decompression to obtain decompressed packets. Access gateway 130 may perform re-ordering, deciphering, and decompression as packets are received from eNode Bs 120 and may forward decompression packets to a recipient entity, e.g., a remote host.

The re-ordering may be performed in various manners for uplink transmission.

In an embodiment, each eNode B 120 detects for error and missing packets and initiates retransmission of these packets. In this embodiment, the eNode Bs may not provide packets in the proper order during handover from eNode B 120a to eNode B 120b due to UE mobility. In particular, there is no guarantee that packets from source eNode B 120a will arrive at access gateway 130 before packets from target eNode B 120b. Access gateway 130 may then perform re-ordering of packets received from different eNode Bs. In another embodiment, target eNode B 120b performs re-ordering and provides packets in-sequence to access gateway 130. In this embodiment, source eNode B 120a may forward its packets to target eNode B 120b during a handover. For all embodiments, access gateway 130 may perform some form of re-ordering of packets received from different eNode Bs, if needed, to ensure in-sequence delivery of these packets to the header decompression entity.

Figure 7:
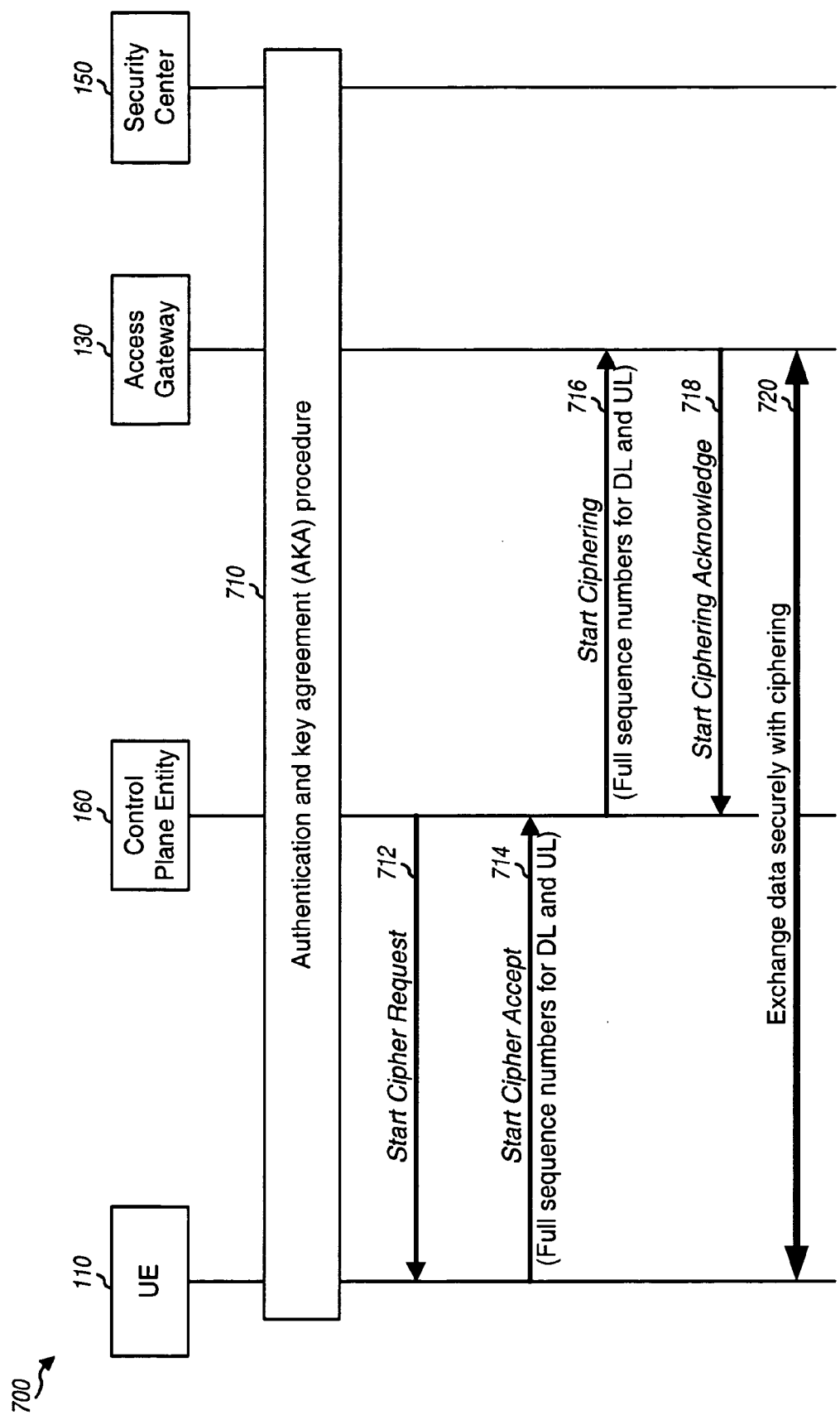
FIG. 7 shows a process for initiating ciphering.

FIG. 7 shows an embodiment of a process 700 for initiating ciphering. Initially, UE 110, access gateway 130, security center 150, and a control plane entity 160 perform the AKA procedure to authenticate access gateway 130 and security center 150 to UE 110, to authenticate UE 110 to access gateway 130, and to provide a cipher key to access gateway 130 (block 710). Control plane entity 160 may be an entity that controls ciphering for UE 110 and may be located at access gateway 130, eNode B 120, or some other network entity. Control plane entity 160 sends to UE 110 a request to start ciphering (step 712). UE 110 receives the request and may generate full sequence numbers for downlink and uplink transmissions, e.g., using an HFN stored at UE 110. UE 110 may return an acknowledgement to start ciphering (step 714). The acknowledgement may include the full sequence numbers for the downlink (DL) and uplink (UL) (as shown in FIG. 7), the more significant portion of each full sequence number, the HFN, and/or other information. Control plane entity 160 then sends to access gateway 130 a start ciphering message that includes information for the full sequence numbers for the downlink and uplink (step 716). Access gateway 130 responds with an acknowledgement (step 718). Access gateway 130 and UE 110 may thereafter exchange data securely with ciphering (block 720).

Figure 8:
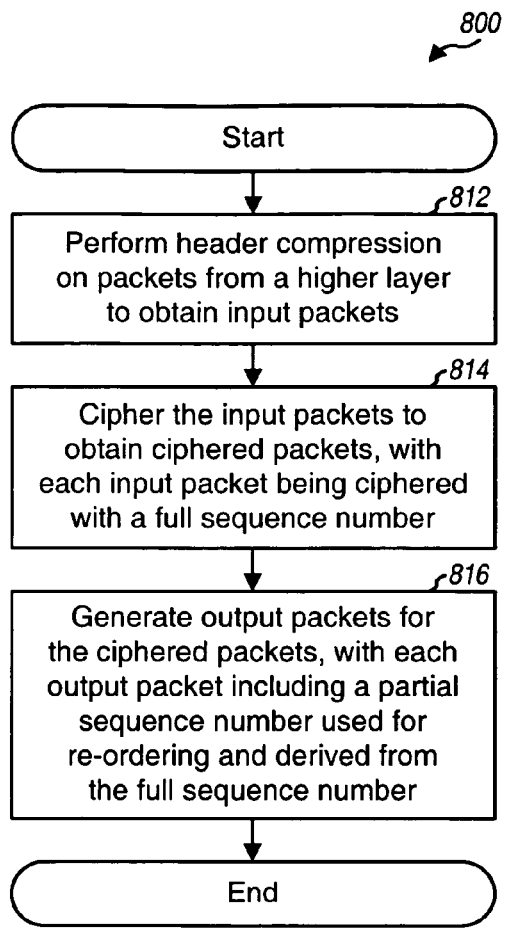
FIG. 8 shows a process performed at the transmitter.

FIG. 8 shows an embodiment of a process 800 performed at a transmitter, which may be access gateway 130 for downlink transmission or UE 110 for uplink transmission. Header compression is performed on packets from a higher layer to obtain input packets (block 812). The input packets are ciphered to obtain ciphered packets, with each input packet being ciphered with a full sequence number (block 814). Output packets are generated for the ciphered packets, with each output packet including a partial sequence number used for re-ordering and derived from the full sequence number (block 816). The full sequence number may be incremented for each input packet, each byte of each packet, and so on. The partial sequence number may be used as a sequence number for RLC and may be used for re-ordering, duplicate detection, error correction, and/or other functions.

One output packet may be generated for each input packet. In this case, the partial sequence number for each output packet may be formed with a predetermined number of LSBs of the full sequence number for a corresponding input packet. Alternatively, segmentation and concatenation may be performed on the ciphered packets to generate the output packets. The partial sequence number for each output packet may then be derived based on the full sequence number for a corresponding ciphered packet. For example, the full sequence number may be incremented for each byte, and the partial sequence number for each output packet may be derived from the full sequence number for the first data byte included in that output packet, as described above.

Figure 9:
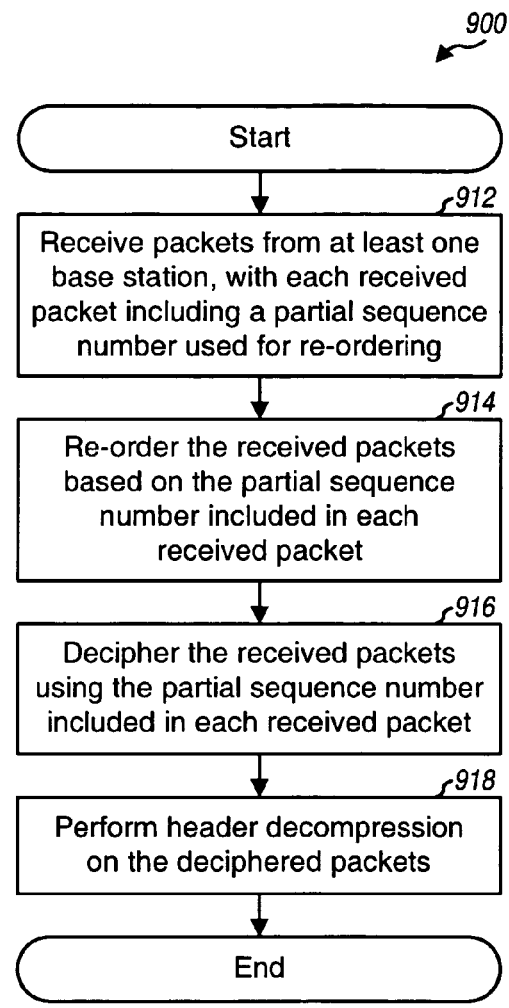
FIG. 9 shows a process performed at the receiver.

FIG. 9 shows an embodiment of a process 900 performed at a receiver, which may be UE 110 for downlink transmission or access gateway 130 for uplink transmission. Packets are received from at least one base station in a wireless communication system, with each received packet including a partial sequence number used for re-ordering (block 912). The received packets may be re-ordered based on the partial sequence number included in each received packet (block 914). Missing packets may be detected based on the partial sequence number in each received packet, and retransmission of missing packets may be requested. The received packets are deciphered using the partial sequence number included in each received packet (block 916). Header decompression may be performed on the deciphered packets (block 918).

If re-assembly is not performed, then deciphering may be performed on each received packet with a full sequence number derived with the partial sequence number included in that received packet. A counter may be maintained for the more significant portion of the full sequence number. The full sequence number for each received packet may then be derived using the counter for a predetermined number of MSBs of the full sequence number and the partial sequence number for a predetermined number of LSBs of the full sequence number. Each received packet may then be deciphered with the full sequence number as a crypto-sync.

If re-assembly is performed, then the received packets may be re-assembled to obtain output packets. Deciphering may then be performed on each output packet with a full sequence number derived based on the partial sequence number for a corresponding received packet and byte counting.

FIG. 10 shows an embodiment of a process 1000 performed at an eNode B for downlink transmission to UE 110. Input packets are received from a network entity (e.g., access gateway 130), with each input packet including an appended sequence number derived from a full sequence number used to cipher the input packet (block 1012). Output packets are generated for the input packets, with each output packet including a partial sequence number used for re-ordering and derived from the appended sequence number in each input packet (block 1014). The output packets are then sent to UE 110 (block 1016). Retransmission of output packets missing at the UE may be performed. The missing output packets may be identified based on the partial sequence number included in each output packet.

An output packet may be generated for each input packet. In this case, the partial sequence number for each output packet may be derived by compressing the appended sequence number for the corresponding input packet. Segmentation and concatenation may also be performed on the input packets to generate the output packets. In this case, the partial sequence number for each output packet may be derived based on the appended sequence number for a corresponding input packet and byte counting.

FIG. 11 shows an embodiment of a process 1100 performed at an eNode B for uplink transmission from UE 110. Packets are received from UE 110, with each received packet including a partial sequence number used for re-ordering (block 1112). The received packets are re-ordered based on the partial sequence number included in each received packet (block 1114). Missing packets may be detected based on the partial sequence number included in each received packet, and retransmission of the missing packets may be requested. Output packets are generated for the re-ordered packets, with each output packet including an appended sequence number used for deciphering and derived from the partial sequence number included in each received packet (block 1116). The output packets are forwarded to a network entity, e.g., access gateway 130 (block 1118).

Figure 12:
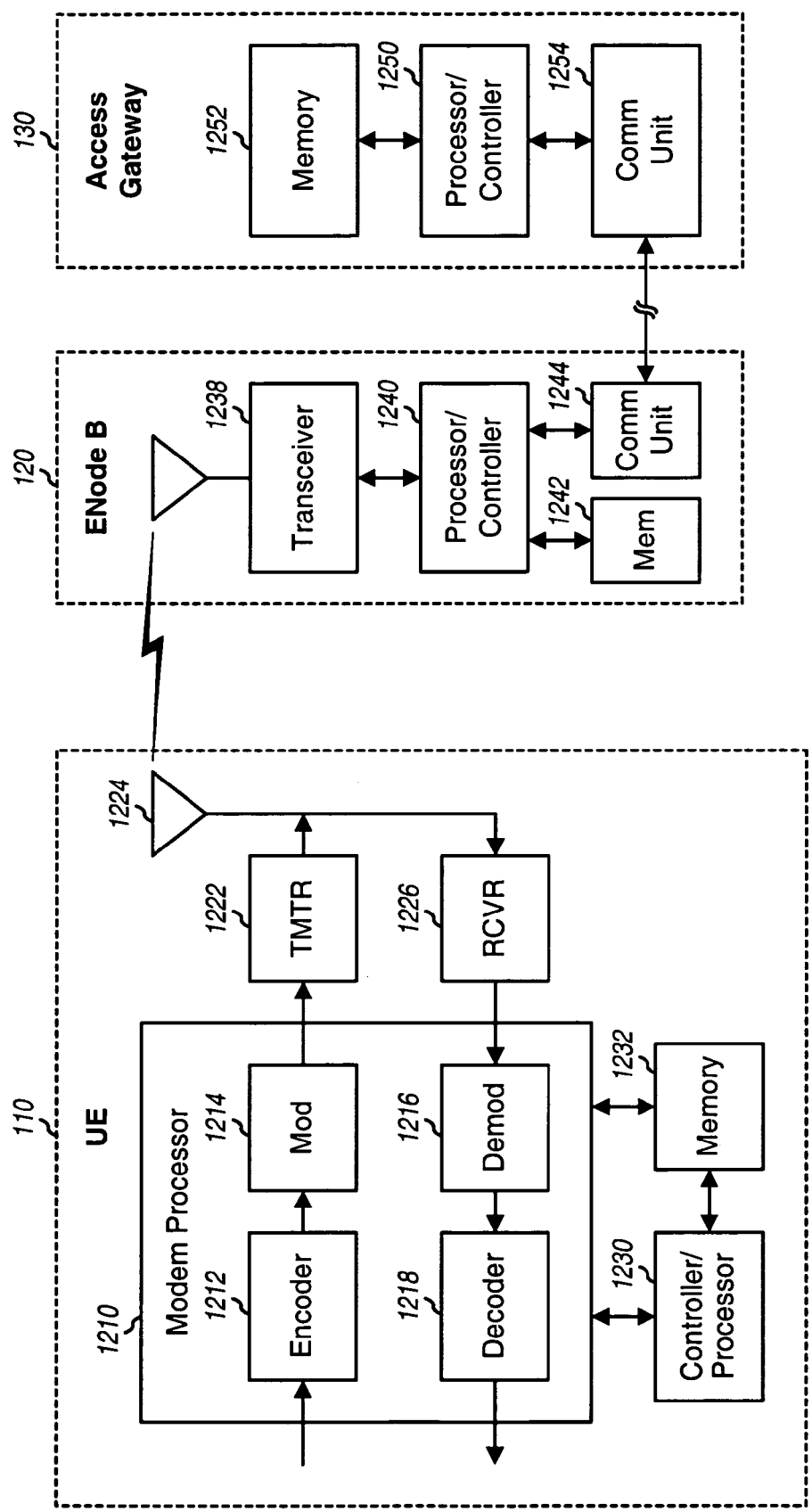
FIG. 12 shows a block diagram of the UE, eNode B, and access gateway.

FIG. 12 shows a block diagram of an embodiment of UE 110, eNode B 120, and access gateway 130. In the transmit direction, data and signaling to be sent by UE 110 are processed (e.g., formatted, encoded, and interleaved) by an encoder 1212 and further processed (e.g., modulated, channelized, and scrambled) by a modulator (Mod) 1214 to generate output chips. A transmitter (TMTR) 1222 then conditions (e.g., converts to analog, filters, amplifies, and frequency upconverts) the output chips and generates an uplink signal, which is transmitted via an antenna 1224. In the receive direction, downlink signals transmitted by eNode Bs are received by antenna 1224. A receiver (RCVR) 1226 conditions (e.g., filters, amplifies, frequency downconverts, and digitizes) the received signal from antenna 1224 and provides samples. A demodulator (Demod) 1216 processes (e.g., descrambles, channelizes, and demodulates) the samples and provides symbol estimates. A decoder 1218 further processes (e.g., deinterleaves and decodes) the symbol estimates and provides decoded data. Encoder 1212, modulator 1214, demodulator 1216, and decoder 1218 may be implemented by a modem processor 1210. These units perform processing in accordance with the radio technology used by the wireless communication network.

A controller/processor 1230 directs the operation of various units at UE 110. Controller/processor 1230 may implement the protocol stack for UE 110 in FIG. 2 and may perform process 800 in FIG. 8, process 900 in FIG. 9, and/or other processes. A memory 1232 stores program codes and data for UE 110. Memory 1232 may store the full sequence numbers for the downlink and uplink, the HFN, and/or other information used for ciphering and RLC.

FIG. 12 also shows an embodiment of eNode B 120, which includes a transceiver 1238, a processor/controller 1240, a memory (Mem) 1242, and a communication (Comm) unit 1244. Transceiver 1238 provides radio communication with UE 110 and other UEs. Processor/controller 1240 performs various functions (e.g., for RLC) for communication with the UEs and may implement process 1000 in FIG. 10, process 1100 in FIG. 11, and/or other processes. Memory 1242 stores program codes and data for eNode B 120. Communication unit 1244 facilitates communication with access gateway 130.

FIG. 12 also shows an embodiment of access gateway 130, which includes a processor/controller 1250, a memory 1252, and a communication unit 1254. Processor/controller 1250 performs various functions (e.g., for PDCP and re-ordering for uplink) for communication with the UEs and may implement process 800 in FIG. 8, process 900 in FIG. 9, and/or other processes. Memory 1252 stores program codes and data for access gateway 130. Memory 1252 may store the full sequence numbers for the downlink and uplink, the HFN, and/or other information used for ciphering and RLC. Communication unit 1254 facilitates communication with eNode B 120.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
at least one processor configured to cipher input packets to obtain ciphered packets, and to perform segmentation and concatenation on the ciphered packets to generate output packets for the ciphered packets, wherein each input packet is ciphered with a full sequence number, and wherein each output packet includes a partial sequence number used for re-ordering and derived from the full sequence number of a corresponding ciphered packet; and
a memory coupled to the at least one processor.

2. The apparatus of claim 1, wherein the partial sequence number is used as a sequence number for Radio Link Control (RLC).

3. The apparatus of claim 1, wherein the at least one processor is configured to generate an output packet for each input packet and to form the partial sequence number for each output packet with a predetermined number of least significant bits of the full sequence number for a corresponding input packet.

4. The apparatus of claim 1, wherein the at least one processor is configured to increment the full sequence number for each input packet.

5. The apparatus of claim 1, wherein the at least one processor is configured to increment the full sequence number for each byte of each input packet.

6. The apparatus of claim 1, wherein the partial sequence number is used for re-ordering, duplicate detection, and error correction of the output packets.

7. The apparatus of claim 1, wherein the at least one processor is configured to receive a request for retransmission of missing packets identified by the partial sequence number included in each output packet, and to retransmit the missing packets.

8. A method comprising:
ciphering input packets to obtain ciphered packets, each input packet being ciphered with a full sequence number; and
performing segmentation and concatenation on the ciphered packets to generate output packets for the ciphered packets, each output packet including a partial sequence number used for re-ordering and derived from the full sequence number of a corresponding ciphered packet.

9. The method of claim 8, wherein the generating the output packets for the ciphered packets comprises generating an output packet for each input packet, and forming the partial sequence number for each output packet with a predetermined number of least significant bits of the full sequence number for a corresponding input packet.

10. The method of claim 8, further comprising:
receiving a request for retransmission of missing packets identified by the partial sequence number included in each output packet; and
retransmitting the missing packets.

11. An apparatus comprising:
means for ciphering input packets to obtain ciphered packets, each input packet being ciphered with a full sequence number; and
means for performing segmentation and concatenation on the ciphered packets to generate output packets for the ciphered packets, each output packet including a partial sequence number used for re-ordering and derived from the full sequence number of a corresponding ciphered packet.

12. The apparatus of claim 11, wherein the means for generating the output packets for the ciphered packets comprises means for generating an output packet for each input packet, and means for forming the partial sequence number for each output packet with a predetermined number of least significant bits of the full sequence number for a corresponding input packet.

13. The apparatus of claim 11, further comprising: means for receiving a request for retransmission of missing packets identified by the partial sequence number included in each output packet; and
means for retransmitting the missing packets.

14. An apparatus comprising:
at least one processor configured to receive packets from at least one base station in a wireless communication system, each received packet including a partial sequence number used for re-ordering, and to decipher the received packets using the partial sequence number included in each received packet; and
a memory coupled to the at least one processor.

15. The apparatus of claim 14, wherein the at least one processor is configured to re-order the received packets based on the partial sequence number included in each received packet.

16. The apparatus of claim 14, wherein the at least one processor is configured to derive a full sequence number for each received packet based on the partial sequence number included in the received packet, and to decipher each received packet with the full sequence number as a crypto-sync.

17. The apparatus of claim 16, wherein the at least one processor is configured to maintain a counter for a more significant portion of the full sequence number, and to derive the full sequence number for each received packet using the counter for a predetermined number of most significant bits of the full sequence number and the partial sequence number for a predetermined number of least significant bits of the full sequence number.

18. The apparatus of claim 14, wherein the at least one processor is configured to perform re-assembly of the received packets to obtain output packets, to derive a full sequence number for each output packet based on the partial sequence number for a corresponding received packet, and to decipher each output packet with the full sequence number as a crypto-sync.

19. The apparatus of claim 14, wherein the at least one processor is configured to detect for missing packets based on the partial sequence number included in each received packet, and to request for retransmission of the missing packets.

20. The apparatus of claim 14, wherein the partial sequence number is used as a sequence number for Radio Link Control (RLC).

21. The apparatus of claim 14, wherein the at least one processor is configured to perform re-ordering, duplicate detection, and error correction based on the partial sequence number included in each received packet.

22. The apparatus of claim 14, wherein the at least one processor is configured to perform header decompression on deciphered packets.

23. A method comprising:
receiving packets from at least one base station in a wireless communication system, each received packet including a partial sequence number used for re-ordering; and
deciphering the received packets using the partial sequence number included in each received packet.

24. The method of claim 23, further comprising:
re-ordering the received packets based on the partial sequence number included in each received packet.

25. The method of claim 23, wherein the deciphering the received packets comprises deriving a full sequence number for each received packet based on the partial sequence number included in the received packet, and deciphering each received packet with the full sequence number as a crypto-sync.

26. The method of claim 23, further comprising:
performing re-assembly of the received packets to obtain output packets; and
wherein the deciphering the received packets comprises deriving a full sequence number for each output packet based on the partial sequence number for a corresponding received packet, and deciphering each output packet with the full sequence number as a crypto-sync.

27. The method of claim 23, further comprising:
detecting for missing packets based on the partial sequence number included in each received packet; and
requesting for retransmission of the missing packets.

28. An apparatus comprising:
means for receiving packets from at least one base station in a wireless communication system, each received packet including a partial sequence number used for re-ordering; and
means for deciphering the received packets using the partial sequence number included in each received packet.

29. The apparatus of claim 28, further comprising:
means for re-ordering the received packets based on the partial sequence number included in each received packet.

30. The apparatus of claim 28, wherein the means for deciphering the received packets comprises means for deriving a full sequence number for each received packet based on the partial sequence number included in the received packet, and means for deciphering each received packet with the full sequence number as a crypto-sync.

31. The apparatus of claim 28, further comprising:
means for performing re-assembly of the received packets to obtain output packets; and
wherein the means for deciphering the received packets comprises means for deriving a full sequence number for each output packet based on the partial sequence number for a corresponding received packet, and means for deciphering each output packet with the full sequence number as a crypto-sync.

32. The apparatus of claim 28, further comprising:
means for detecting for missing packets based on the partial sequence number included in each received packet; and
means for requesting for retransmission of the missing packets.

33. An apparatus comprising:
  at least one processor configured to receive input packets from a network entity, to perform segmentation and concatenation on the input packets to generate output packets for the input packets, and to send the output packets to a user equipment (UE), wherein each input packet includes an appended sequence number derived from a full sequence number used to cipher the input packet, and wherein each output packet includes a partial sequence number used for re-ordering and derived from the appended sequence number in each input packet; and
  a memory coupled to the at least one processor.

34. The apparatus of claim 33, wherein the at least one processor is configured to generate an output packet for each input packet and to derive the partial sequence number for each output packet by compressing the appended sequence number for the input packet.

35. The apparatus of claim 33, wherein the at least one processor is configured to perform retransmission of output packets missing at the UE, wherein the missing output packets are identified based on the partial sequence number included in each output packet.

36. A method comprising:
  receiving input packets from a network entity, each input packet including an appended sequence number derived from a full sequence number used to cipher the input packet;
  performing segmentation and concatenation on the input packets to generate output packets for the input packets, each output packet including a partial sequence number used for re-ordering and derived from the appended sequence number in each input packet; and
  sending the output packets to a user equipment (UE).

37. The method of claim 36, wherein the generating the output packets for the input packets comprises generating an output packet for each input packet, and deriving the partial sequence number for each output packet by compressing the appended sequence number for the input packet.

38. An apparatus comprising:
  at least one processor configured to receive packets from a user equipment (UE), to re-order the received packets based on a partial sequence number included in each received packet, to generate output packets for the re-ordered packets, and to forward the output packets to a network entity, wherein each output packet includes an appended sequence number used for deciphering and derived from the partial sequence number included in each received packet; and
  a memory coupled to the at least one processor.

39. The apparatus of claim 38, wherein the at least one processor is configured to detect for missing packets based on the partial sequence number included in each received packet, and to request for retransmission of the missing packets.

40. A method comprising:
  receiving packets from a user equipment (UE), each received packet including a partial sequence number used for re-ordering;
  re-ordering the received packets based on the partial sequence number included in each received packet;
  generating output packets for the re-ordered packets, each output packet including an appended sequence number used for deciphering and derived from the partial sequence number included in each received packet; and
  forwarding the output packets to a network entity.

41. The method of claim 40, further comprising:
  detecting for missing packets based on the partial sequence number included in each received packet; and
  requesting for retransmission of the missing packets.

42. An apparatus comprising:
  at least one processor configured to receive input packets from a higher layer at a Radio Link Control (RLC) sublayer, to perform segmentation and concatenation on the input packets to generate output packets for the input packets, and to derive an RLC sequence number for each output packet based on sequence information included in each input packet and indicative of an order of the input packet, wherein the RLC sequence number for each output packet is used for re-ordering; and
  a memory coupled to the at least one processor.

43. An apparatus comprising:
  at least one processor configured to receive input packets from a higher layer at a Radio Link Control (RLC) sublayer, to generate output packets for the input packets, and to derive an RLC sequence number for each output packet based on sequence information included in each input packet and indicative of an order of the input packet, wherein the RLC sequence number for each output packet is used for re-ordering, and wherein the sequence information for each input packet is used as a crypto-sync for ciphering of the input packet; and
  a memory coupled to the at least one processor.

44. An apparatus comprising:
  at least one processor configured to send a set of packets redundantly to each of multiple base stations, wherein each packet in the set includes a different sequence number, and wherein duplicate packets sent to the multiple base stations include same sequence number; and
  a memory coupled to the at least one processor.

45. The apparatus of claim 44, wherein each packet in the set includes a different partial sequence number, and wherein the at least one processor is configured to determine a full sequence number for each packet in the set, to cipher each packet with the full sequence number for the packet, and to determine the partial sequence number for each packet based on the full sequence number for the packet.

46. The apparatus of claim 44, wherein the sequence number included in each packet is used as a sequence number for Radio Link Control (RLC).

47. An apparatus comprising:
  at least one processor configured to receive at least one packet, to cipher each packet with a sequence number for the packet, and to increment the sequence number for each byte of each packet or for each packet; and
  a memory coupled to the at least one processor.

48. A non-transitory computer readable medium comprising code, which, when executed by a processor, causes the processor to perform operations for wireless communication, the computer readable medium comprising:
  code for ciphering input packets to obtain ciphered packets, each input packet being ciphered with a full sequence number; and
  code for performing segmentation and concatenation on the ciphered packets to generate output packets for the ciphered packets, each output packet including a partial sequence number used for re-ordering and derived from the full sequence number of a corresponding ciphered packet.

49. The computer readable medium of claim 48, wherein the code for generating the output packets for the ciphered packets comprises code for generating an output packet for each input packet, and code for forming the partial sequence number for each output packet with a predetermined number of least significant bits of the full sequence number for a corresponding input packet.

50. The computer readable medium of claim 48, further comprising:

code for receiving a request for retransmission of missing packets identified by the partial sequence number included in each output packet; and code for retransmitting the missing packets.

51. A non-transitory computer readable medium comprising code, which, when executed by a processor, causes the processor to perform operations for wireless communication, the computer readable medium comprising:

code for receiving packets from at least one base station in a wireless communication system, each received packet including a partial sequence number used for re-ordering; and code for deciphering the received packets using the partial sequence number included in each received packet.

52. The computer readable medium of claim 51, further comprising:

code for re-ordering the received packets based on the partial sequence number included in each received packet.

53. The computer readable medium of claim 51, wherein the code for deciphering the received packets comprises code for deriving a full sequence number for each received packet based on the partial sequence number included in the received packet, and code for deciphering each received packet with the full sequence number as a crypto-sync.

54. The computer readable medium of claim 51, further comprising:

code for performing re-assembly of the received packets to obtain output packets; and wherein the code for deciphering the received packets comprises code for deriving a full sequence number for each output packet based on the partial sequence number for a corresponding received packet, and code for deciphering each output packet with the full sequence number as a crypto-sync.

55. The computer readable medium of claim 51, further comprising:

code for detecting for missing packets based on the partial sequence number included in each received packet; and code for requesting for retransmission of the missing packets.

56. The apparatus of claim 1, wherein the full sequence number is based upon a Packet Data Convergence Protocol (PDCP) sequence number.

57. The method of claim 8, wherein the full sequence number is based upon a Packet Data Convergence Protocol (PDCP) sequence number.

58. The apparatus of claim 11, wherein the full sequence number is based upon a Packet Data Convergence Protocol (PDCP) sequence number.

59. The computer readable medium of claim 48, wherein the full sequence number is based upon a Packet Data Convergence Protocol (PDCP) sequence number.

60. The apparatus of claim 1, wherein the partial sequence number for each output packet is shorter than the full sequence number for the corresponding ciphered packet.

* * * * *